UNITED STATES PATENT OFFICE.

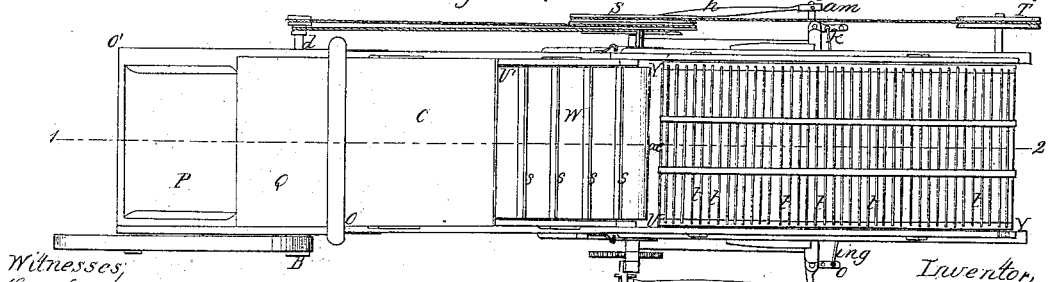

DAVID BARGER, OF COLUMBIA, NEW YORK.

THRESHING-MACHINE.

Specification of Letters Patent No. 29,946, dated September 11, 1860.

*To all whom it may concern:*

Be it known that I, DAVID BARGER, of Columbia, county of Herkimer, and State of New York, have invented certain new and useful Improvements in Threshing-Machines; and I do hereby declare that the following is a full, clear, and exact description thereof, reference being had to the annexed drawings, making part of this specification, in which—

Figure 1 is a plan view, Fig. 2 is a longitudinal section, and Figs. 3 and 4 are side elevations.

Like figures and letters refer to like parts in all the drawings.

O, O', represent the threshing frame; F, threshing cylinder; P, feeding trough; Q, box over cutting cylinder; U, U', grain carrier; $ac'$, $ac'$, connections of grain carrier with straw carrier; $psi$, $psi$, standards supporting grain carrier upon winnower; W, endless cloth apron; Y, Y', straw carrier; $f'$, $f'$, supports of straw carrier; $k'$, overblast fanning wheel; $m'$, adjustable blast-board; $chi$, pivot of blast board; $l'$, hook attached to blast board; $p'$, hopper; $s'$, upper shoe; $q'$, feeder, $r'$, riddle in upper shoe; $u'$, lower shoe; $v'$, connection of lower shoe with winnower frame; $y'$, upper riddle or sieve of lower shoe; $z'$, lower riddle of lower shoe; $ki$, vertical support of lower shoe; $t'$, connection of upper shoe with scroll of winnower; $h$, connecting bar working lower shoe; $m$, connecting bar working upper shoe; $x'$, saving board; $aa$, refuse box; $ab$, grain box; $am$, connection of bar $h$, with elbow $o$; $i$, elbow; $al$, cam; $k$, hook connecting gearing with lower shoe; $o$, elbow on right side of machine; $ing$, hook connecting gearing with upper shoe.

This machine is intended to be worked by horse power, or any other suitable power.

The threshing box O, O', is made in the usual manner. The threshing cylinder F is made of iron, with staple teeth $x$, $x$. The pulley or wheel B, of the axle $d$, receives the power. The upper side of endless cloth apron W, is on a line with the upper curve of concave $z$. The grain carrier V, V', and straw carrier Y, Y', are made in the same way as many others are, the only difference being in their connections, which are so arranged as to admit of an easy disconnection of the various parts of the machine. The grain carrier is attached to the cutting or threshing box, by the hooks $ac'$, resting on a screw fastened into the frame of the cutting box. The straw-carrier is attached to the grain carrier in the same way substantially, and rests upon the winnomer by the supports $f'$.

The cover C, prevents the grain from flying out of the grain-carrier, when passing out from under the cylinder F. The belt wheels T, and S, must come in line with the pulley or drum B, in order that the gearing shall work easily and well. The space $ae$, between the straw carrier and the grain carrier, is two inches. The frame of the fanning mill is made of suitable timber, 3 inches square, framed together. The posts are four feet long at the scroll, and four feet and a half long at the back end of the mill; in order to give space to hang the wires sustaining the shoes. The mill is five feet wide on the inside of the frame; the girts on the sides are three feet from post to post, which is the size of the frame. The scroll D', is twenty eight inches in diameter and the scroll holes are sixteen inches in diameter, giving six inches outside for the wind to gather in. The scroll extends two-thirds of the way up the mill, on the side next the shoes.

The blast-board, working upon the pivot or hinge, $chi$, extends within a short distance of the shoes; sufficiently distant to allow the necessary play of the board. Attached to the outer end of the blast-board is the hook $l'$, as shown in Fig. 2.

The staples $n'$, $n''$, $n'''$ are driven into the inside of the winnowing frame, at intervals measured to throw the wind from the fan, upon any portion of the sieve or riddle. This is effected by raising or lowering the hook $l'$, to the proper position.

The upper shoe $s'$, is made to run back, to form a hopper $p'$, or in other words, the hopper and upper shoe are framed in one. The upper shoe has only one sieve $r'$. Both shoes hang from the cross-bar $c'$, by the rods $ki$, and $g'$. The lower shoe is the same as a shoe of a hand mill, taken off below the first sieve. The rods $ki$, run down past the side of the first shoe, and are fastened to the cross-bar $c'$, with eyes in the shoe. Both shoes are worked from the shaft $k'$, of the mill, which causes the shoes to vibrate equally, one over the other. The grain discharges into the box $ab$, which is four feet long, three feet wide, and eight inches deep. This box $ab$, slides out on either side of the mill, and can thus be emptied without trouble. The machine, with five men working at it, is capable of threshing and cleaning one hundred bushels of oats or rye, or about fifty bushels of wheat, in one hour, separating the chess and cockle from the grain, at the first passage of the grain through the mill. To effect this result there are various sizes of sieves or riddles, which, being used in certain combinations, thoroughly sift the grain from all impurities.

Nos. 1, 2, 3 and 4 in red ink represent these riddles.

No. 1, is a sieve to be used in upper shoe, and serves as a beaker in threshing wheat; and must always be left in its place, to thresh all kinds of grain.

No. 2, is a fine sieve to be placed in the lower shoe under sieve No. 1, in threshing wheat.

No. 3, is a thistle bur sieve; when used to clean such matter from the grain, No. 2, must be taken out of the rack and No. 3, put in its place; this is used principally when cleaning oats.

No. 4, is the screen the wheat runs over; it separates the chess and cockle from the wheat. This is done at the time of threshing, thus depositing the grain in the grain box, clear of all impurities, without passing the grain through after its having been threshed.

The box aa, is the receptacle of all refuse; it slides out easily from the rear of the mill, and is held in its place by a turn-latch.

Having described the construction and therein the operation of portions, of the machine, I will proceed to describe its full operation.

The grain in the straw is fed into the threshing box at P, is beaten out by the beaters $x$, $x$, &c., passes out into the grain carrier, where most of the grain falls upon the endless apron W, between the slats $s$, $s$, &c., while the straw rests upon said slats. The motion of this endless apron, imparted by the wheel S, carries the grain and straw upward, until each subdivision of the apron arrives at the opening $ac$, when the grain falls into the hopper $p'$, and the straw passes onto the straw carrier. Any detached grain that remains in the straw will fall between the slats $t$, $t$, &c., onto the floor of straw-carrier, and will be swept down by the under portion of the straw carrier, into the hopper. The straw in the meantime will pass out at the posterior of the machine, over the straw carrier. The grain which falls into the hopper, is distributed upon the upper riddle by the feeder $q'$, (the riddle and hopper continually vibrating); then passes from one sieve to another until at last the grain is deposited in the box $ab$, and the refuse into the box $aa$. The upper and lower shoes being worked from the same axle, and the connecting bars being of equal length, of course they vibrate at an equal speed. This equality of motion is necessary to gain the full advantage of the blast of wind upon the riddle. In threshing light grains the blast should be directed by the board $m'$, so as to strike about half way from the drop of the grain on the first sieve $r'$, to the posterior end of same.

The winnower can be used with an under shot wheel, if it is desired, although it will not work as well. The winnower can also be entirely detached from the thresher and used with any other thresher or by itself as a hand mill.

What I claim as new and desire to secure by Letters-Patent, is—

The combination and arrangement of the adjustable blast-board $m'$, hook $l'$, staples $n'$, $n''$, $n'''$, upper shoe $s'$, lower shoe $u'$, furnished with sieves, numbered 1, 2, 3 and 4; operated by the two connecting bars, $m$ and $h$, working on opposite sides of the winnower, and from the same shaft, as specified.

DAVID BARGER.

Witnesses:
  H. I. CREWELL,
  THOS. CUNNINGHAM.